(12) United States Patent
Kimura et al.

(10) Patent No.: US 12,210,248 B2
(45) Date of Patent: Jan. 28, 2025

(54) LIQUID CRYSTAL DISPLAY DEVICE HAVING A LIQUID CRYSTAL LIGHT VALVE

(71) Applicant: Japan Display Inc., Tokyo (JP)

(72) Inventors: Shunichi Kimura, Tokyo (JP);
Toshiharu Matsushima, Tokyo (JP);
Shinichi Komura, Tokyo (JP)

(73) Assignee: Japan Display Inc., Tokyo (JP)

( * ) Notice: Subject to any disclaimer, the term of this patent is extended or adjusted under 35 U.S.C. 154(b) by 127 days.

(21) Appl. No.: 17/708,166

(22) Filed: Mar. 30, 2022

(65) Prior Publication Data

US 2022/0221763 A1 Jul. 14, 2022

Related U.S. Application Data

(63) Continuation of application No. PCT/JP2020/031988, filed on Aug. 25, 2020.

(30) Foreign Application Priority Data

Oct. 7, 2019 (JP) .................. 2019-184213

(51) Int. Cl.
*G02F 1/1343* (2006.01)
*G02F 1/1335* (2006.01)
*G02F 1/1347* (2006.01)

(52) U.S. Cl.
CPC .. *G02F 1/134336* (2013.01); *G02F 1/133512* (2013.01); *G02F 1/133601* (2021.01); *G02F 1/13439* (2013.01); *G02F 1/1347* (2013.01)

(58) Field of Classification Search
CPC ................ G02F 1/133601; G02F 1/133512
See application file for complete search history.

(56) References Cited

U.S. PATENT DOCUMENTS

2017/0032744 A1 2/2017 Yoo et al.
2018/0224704 A1* 8/2018 Shao ................ G02F 1/134336
(Continued)

FOREIGN PATENT DOCUMENTS

JP 2017-116683 A 6/2017

OTHER PUBLICATIONS

International Search Report mailed on Nov. 17, 2020, for the corresponding PCT Application No. PCT/JP2020/031988, with English machine translation.

(Continued)

*Primary Examiner* — Paisley L Wilson
(74) *Attorney, Agent, or Firm* — Michael Best & Friedrich LLP

(57) ABSTRACT

The purpose of the present invention is to realize a high contrast display with liquid crystal display device using a liquid crystal light valve. A representative structure is as follows. A liquid crystal display device includes a liquid crystal display panel, a backlight, and a liquid crystal light valve; the light valve includes a plurality of first electrodes extending in a first direction and formed on the first substrate; a first insulating film is formed on the first electrode; a plurality of second electrodes are formed in a matrix at predetermined intervals on the first insulating film; a second insulating film is formed on the second electrodes; a plurality of third electrodes extending in a second direction are formed on the second insulating film; the liquid crystal is sandwiched between the third electrodes and the second substrate; the predetermined interval between the second electrodes is 2 to 10 μm.

6 Claims, 25 Drawing Sheets

(56) References Cited

U.S. PATENT DOCUMENTS

| | | | |
|---|---|---|---|
| 2018/0259819 A1* | 9/2018 | Kajita | G02F 1/133345 |
| 2020/0183222 A1* | 6/2020 | Yoon | G09G 3/342 |

OTHER PUBLICATIONS

SID 2017 Digest 1667 P108/O. Yoo et al.

\* cited by examiner

E-E

F-F

F-F

G-G

H-H

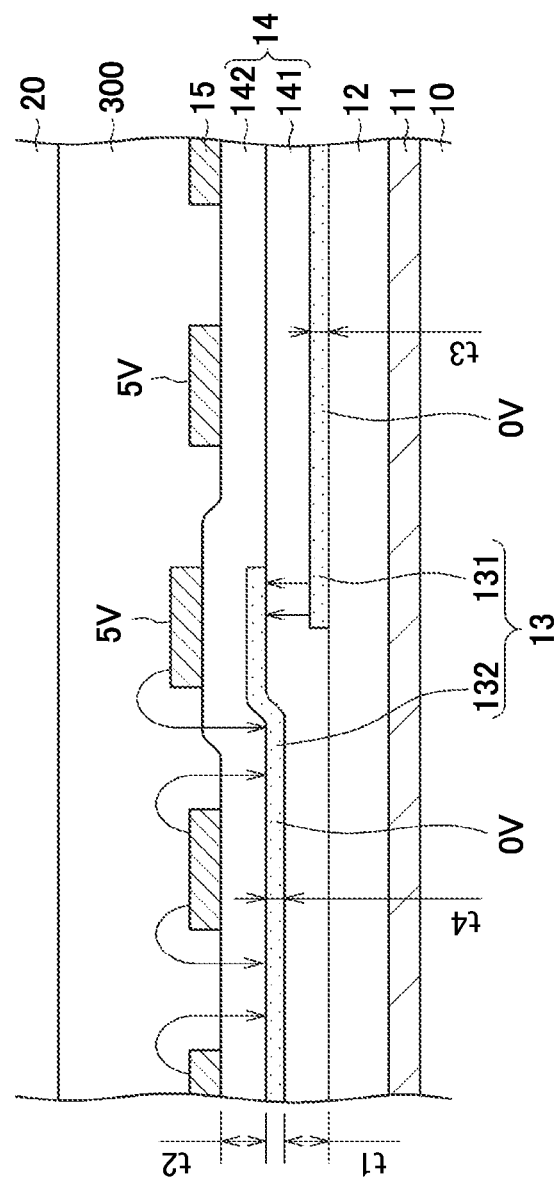

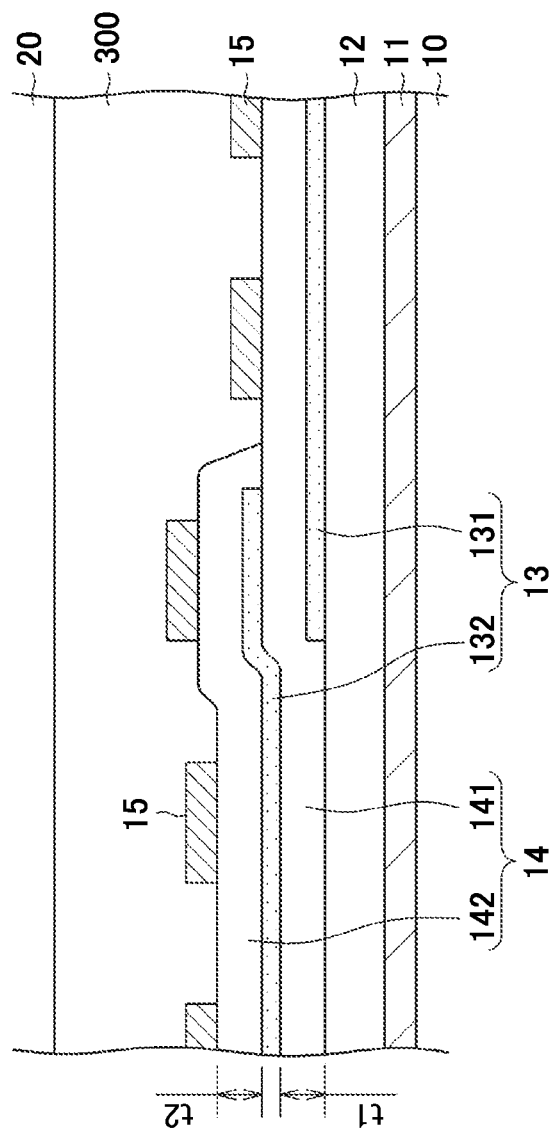

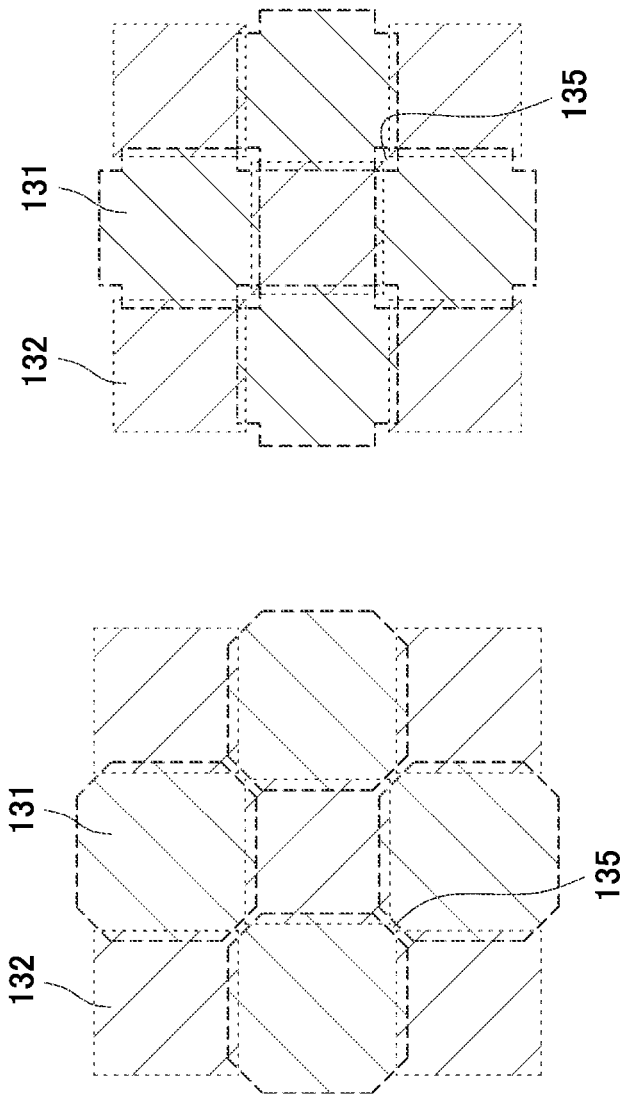

LIQUID CRYSTAL DISPLAY DEVICE HAVING A LIQUID CRYSTAL LIGHT VALVE

The present application is a continuation application of International Application No. PCT/JP2020/031988, filed on Aug. 5, 2020, which claims priority to Japanese Patent Application No. 2019-184213, filed on Oct. 7, 2019. The contents of these applications are incorporated herein by reference in their entirety.

BACKGROUND OF THE INVENTION

(1) Field of the Invention

The present invention relates to a display device and, more particularly, to a liquid crystal display device which has improved contrast of an image using a liquid crystal light valve.

(2) Description of the Related Art

In a liquid crystal display device, a TFT substrate in which a pixel electrode, a thin film transistor (TFT, Thin Film Transistor) and so forth are formed in a matrix form, a counter substrate is disposed facing the TFT substrate, and a liquid crystal layer is sandwiched between the TFT substrate and the counter substrate. Images are formed by changing a light transmittance from a back light in each of the pixels by liquid crystals.

In a conventional liquid crystal display device, since a backlight also irradiates a portion of black display, and a small amount of light passes through the black display portion, the contrast is lowered. In order to solve this problem, there is a technique in which a liquid crystal light valve is disposed on a back surface of a liquid crystal display panel; a backlight does not irradiate a black display portion by using a liquid crystal light valve, and light from a backlight irradiates only a portion where an image is formed.

The above technology is described in Patent Document 1, Patent Document 2, and Non-patent Document 1.

PRIOR ART REFERENCE

Patent Document

[Patent document 1] Japanese Patent Application Publication No. JP 2017-116683 A
[Patent document 2] U.S. Patent Application Publication No. US 2017/0032744 A

Non-Patent Document

[Non-patent document 1] SID 2017 DIGEST•1667 P108/O. Yoo et al

SUMMARY OF THE INVENTION

By arranging a liquid crystal light valve between the back of the liquid crystal display panel and the back light, the contrast of the image can be improved. In other words, it is possible to realize deep black and improve contrast by irradiating only a portion where an image is formed with a backlight by a liquid crystal light valve and not irradiating a black display portion with a backlight.

However, in a technique using a liquid crystal light valve, light is controlled for each segment. The size of the segment is much larger than that of the pixel in the display panel, e.g., about 45×20 pixels of the pixel set in the display panel. By the way, although a red picture element, a green picture element, and a blue picture element exist in a display panel, in this specification, the combination of a red picture element, a green picture element, and a blue picture element is called a pixel set.

On the other hand, it is not desirable to use a light shading film as metal film, as much as possible, in order to prevent a declining of light transmittance and generation of moiré due to an interference between the display panel and the metal film. Then, control of light at the boundary between the segment and the segment becomes a problem. In other words, a region, in which light transmittance cannot be controlled, is generated at the boundary between the segment and the segment in the liquid crystal light valve. This causes uneven luminance in the liquid crystal display device.

It is an object of the present invention, with using a liquid crystal light valve, to provide a liquid crystal display device which is capable of producing a high contrast display by preventing light leakage between segments and segments in a liquid crystal light valve, and thus by preventing the occurrence of uneven brightness.

The present invention solves the above problems, and the main specific means thereof are as follows.

(1) A liquid crystal display device includes a liquid crystal display panel, a backlight, and a liquid crystal light valve disposed between the liquid crystal display panel and the backlight; in which a liquid crystal is sandwiched between a first substrate and a second substrate in the liquid crystal light valve; a plurality of first electrodes extending in a first direction are formed on the first substrate;
   a first insulating film is formed on the first electrodes; a plurality of second electrodes are formed in a matrix at predetermined intervals on the first insulating film; a second insulating film is formed on the second electrodes; a plurality of third electrodes extending in a second direction are formed on the second insulating film; the liquid crystal is sandwiched between the third electrodes and the second substrate; the first electrodes, the second electrodes and the third electrodes are formed from a transparent conductive film; and the predetermined interval between the second electrodes is 2 to 10 μm.

(2) The liquid crystal display device according to (1); in which a black matrix is formed in the liquid crystal display panel; a width of the black matrix is larger than the predetermined interval between the second electrodes; and the predetermined interval between the second electrodes is covered by the black matrix in a plan view.

(3) A liquid crystal display device includes a liquid crystal display panel, a backlight, and a liquid crystal light valve disposed between the liquid crystal display panel and the backlight; in which a liquid crystal is sandwiched between a first substrate and a second substrate in the liquid crystal light valve; a plurality of first electrodes of striped shape extending in a first direction are formed on the first substrate; a first insulating film is formed on the first electrodes; a plurality of second electrodes of a plane shape are formed in a matrix at predetermined intervals on the first insulating film; a second insulating film is formed on the second electrodes; a plurality of third electrodes extending in a second direction are formed on the second insulating film; the liquid crystal is sandwiched between the third electrodes and the second substrate; the first electrodes, the second electrodes and the third electrodes are formed from a transparent conductive film; a plurality of slits are formed in the third electrode at an area overlapping with the second electrode in a plan view, and the predetermined interval between the second electrodes is covered by the third electrode.

(4) A liquid crystal display device includes a liquid crystal display panel, a backlight, and a liquid crystal light valve disposed between the liquid crystal display panel and the backlight; in which a liquid crystal is sandwiched between a first substrate and a second substrate in the liquid crystal light valve; a plurality of first electrodes of striped shape extending in a first direction are formed on the first substrate; a first insulating film is formed on the first electrodes; a plurality of second electrodes of plane shape formed at first predetermined intervals on the first insulating film; a second insulating film is formed on the second electrodes; a plurality of third electrodes of plane shape are formed at second predetermined intervals on the second insulating film; a third insulating film is formed on the third electrodes; a plurality of fourth electrodes extending in a second direction are formed on the third insulating film; the liquid crystal is sandwiched between the fourth electrodes and the second substrate; the first electrodes, the second electrodes, the third electrodes, and the fourth electrodes are formed from a transparent conductive film; the third electrode is disposed between the second electrodes in a plan view; and the second electrode and the third electrode overlap each other at their peripheries in a plan view.

BRIEF DESCRIPTION OF THE DRAWINGS

FIG. 25 is another cross sectional view of embodiment 3;

FIG. 26 is yet another cross sectional view of embodiment 3;

FIG. 29 is a plan view of the second electrode according to yet another example of embodiment 3; and FIG. 30 is a plan view of the second electrode according to yet another example of embodiment 3.

DETAILED DESCRIPTION OF THE PREFERRED EMBODIMENTS

The present invention is explained by the following embodiments in detail.

Embodiment 1

Figure 1:
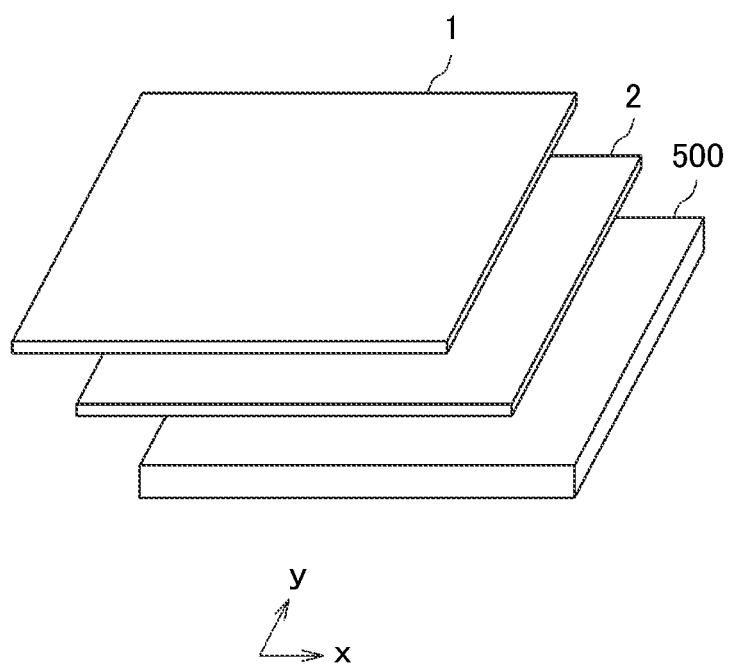
FIG. 1 is an exploded perspective view of a liquid crystal display device in which the present invention is to be applied.

FIG. 1 is an exploded perspective view of a liquid crystal display device according to the present invention. In FIG. 1, a liquid crystal light valve 2 for improving the contrast is disposed between a liquid crystal display panel 1 and a backlight 500.

Figure 2:
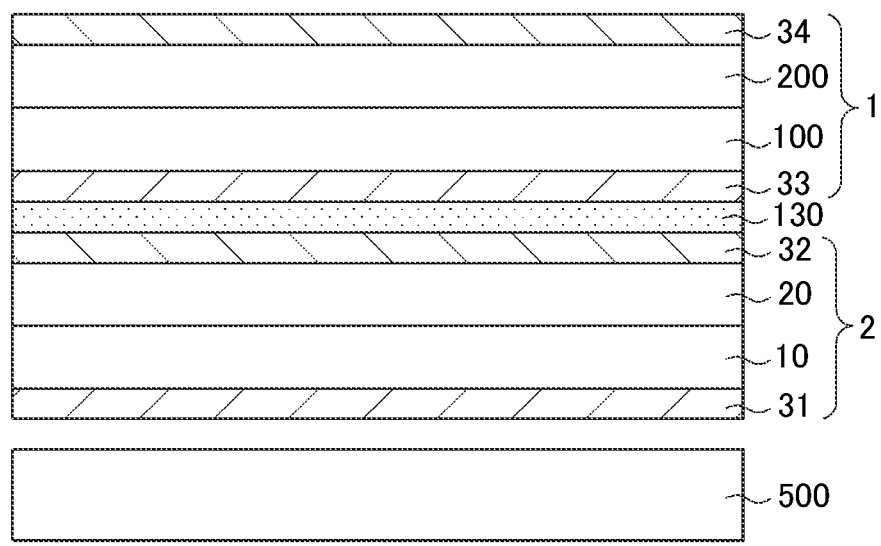
FIG. 2 is a cross sectional view of the liquid crystal display device in which the present invention is to be applied.

FIG. 2 is a cross-sectional view of the liquid crystal display device of FIG. 1 in the assembled state. In FIG. 2, the liquid crystal light valve 2 is arranged on the backlight 500, and the liquid crystal display panel 1 is adhered on the liquid crystal light valve 2 by a transparent adhesive material 130.

In the liquid crystal light valve 2, the liquid crystal is sandwiched between a lower first substrate 10 and an upper second substrate 20; a first polarizing plate 31 is stuck under the first substrate, and a second polarizing plate 32 is stuck on the second substrate. The liquid crystal light valve 2 employs an IPS (In Plane Switching) system. The IPS system has excellent viewing angle characteristics.

The liquid crystal display panel 1 is disposed on the second polarizing plate 32 of the liquid crystal light valve 2 via the transparent adhesive 130. In the liquid crystal display panel 1, a TFT substrate 100 and a counter substrate 200 are bonded to each other by a sealant, and a liquid crystal is sandwiched between the TFT substrate 100 and the counter substrate 200. A third polarizing plate 33 is stuck under the TFT substrate 100, and a fourth polarizing plate 34 is stuck on the counter substrate 200.

On the TFT substrate 100, a video signal line, a scanning line, a TFT, a pixel electrode, a counter electrode, and the like are formed, and on the counter substrate 200, a color filter, a black matrix, and the like are formed. In the present invention, the liquid crystal display panel 1 uses an IPS system having excellent viewing angle characteristics; however, other methods, such as TN (Twisted Nematic) system and VA (Vertical Alignment) system and the like, may be used.

Figure 3:
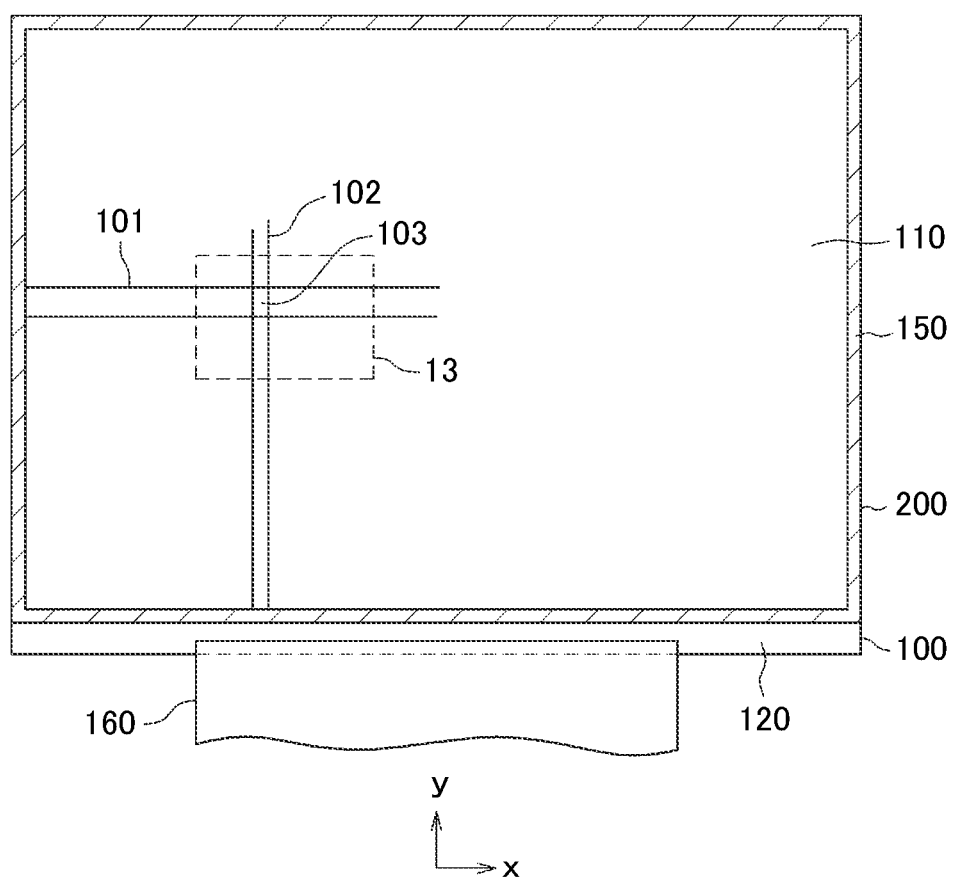
FIG. 3 is a plan view of the liquid crystal display device in which the present invention is to be applied.

FIG. 3 is a plan view of the liquid crystal display device according to the present invention. In FIG. 3, the TFT substrate 100 and the counter substrate 200 are bonded together by a sealant 150, and a liquid crystal is sandwiched between the TFT substrate 100 and the counter substrate 200. A display region 110 is formed in a portion where the TFT substrate 100 and the counter substrate 200 overlap each other, and a region where the TFT substrate 100 is not overlapped with the counter substrate 200 is a terminal region 120. A flexible wiring board 160 for supplying power and a signal to the liquid crystal display device is connected to the terminal region 120.

In the display region 110 of the TFT substrate 100, scanning lines 101 extend in the horizontal direction (x-direction) and are arranged in the vertical direction (y-direction). Further, video signal lines 102 extend in the vertical direction and are arranged in the horizontal direction. A pixel 103 is formed in an area surrounded by the scanning line 101 and the video signal line 102. A red pixel corresponding to a red color filter, a green pixel corresponding to a green color filter, and a blue pixel corresponding to a blue color filter constitute a pixel set.

In FIG. 3, a rectangular region surrounded by a dotted line is a segment electrode 13 formed in a liquid crystal light valve, and controls an amount of light from a backlight supplied to a liquid crystal display panel for each segment electrode 13. The segment electrode 13 has a size much larger than that of a pixel formed on a liquid crystal display panel, and has a size corresponding to, for example, 45×20 pixels of a pixel set.

Figure 4:
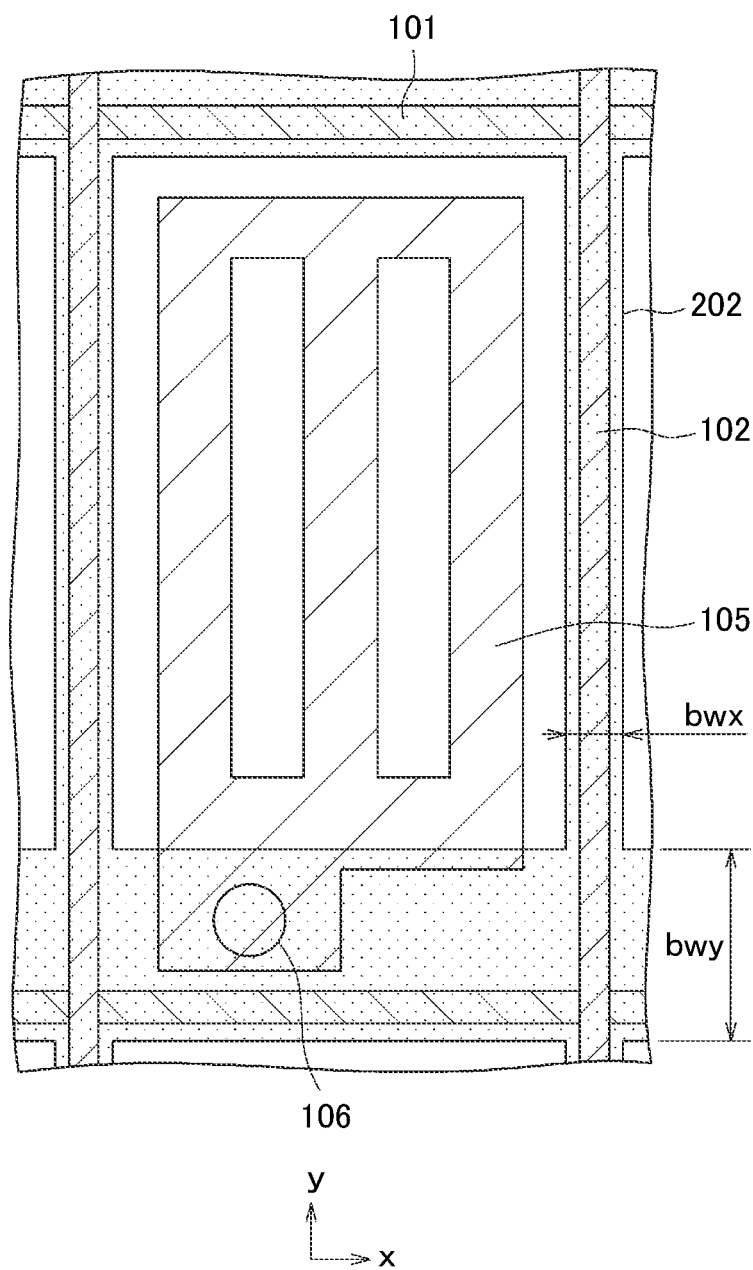
FIG. 4 is a plan view of a pixel of the liquid crystal display panel.

FIG. 4 is a plan view of a pixel portion of a liquid crystal display panel. In FIG. 4, a scanning line 101 extends in the horizontal direction (x direction) and the video signal line 102 extends in the vertical direction (y direction) on the TFT substrate. A pixel electrode 105 is formed in an area surrounded by the scanning line 101 and the video signal line 102. The pixel electrode 105 has a comb-like shape having slits. The pixel electrode 105 is connected to the TFT via the through hole 106.

In FIG. 4, a portion displayed in gray is a black matrix 202 formed on a counter substrate. The black matrix 202 covers a portion corresponding to the video signal line 102 and the scanning line 101, and a color filter is present on the counter substrate and a pixel electrode 105 is present on the TFT substrate in an area surrounded by a frame of the black matrix 202. The width bwy of the horizontally extending black matrix 202 is larger than the width bwx of the vertically extending black matrix 202. In the black matrix 202, a black matrix 202 extending laterally with a width bwy covers the region where the TFT and the through-hole 106 are formed and prevents light leakage from these portions. The width bwy of the black matrix 202 extending in the lateral direction is, for example, 13 to 15 μm, and the width bwx of the black matrix 202 extending in the vertical direction is 4 to 5 μm.

Figure 5:
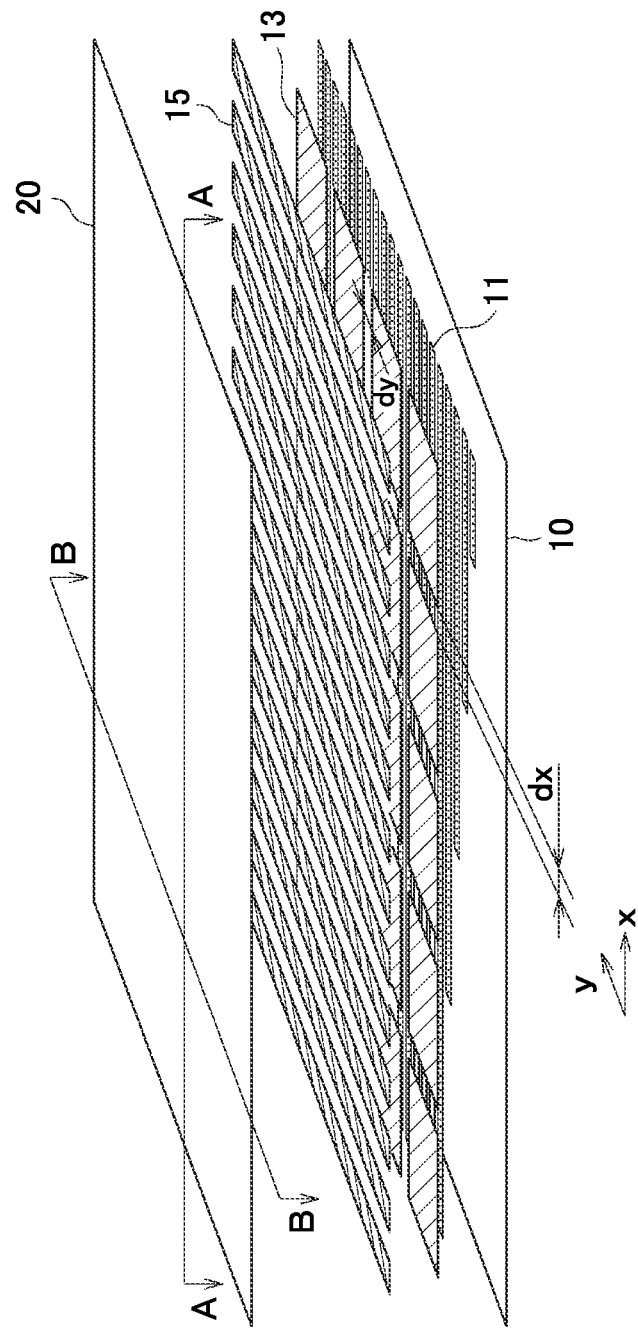
FIG. 5 is an exploded perspective view of the liquid crystal light valve.

FIG. 5 is an exploded perspective view of a liquid crystal light valve. In FIG. 5, a data line (hereinafter, sometimes referred to as a first electrode) 11 extends in a stripe shape on a first substrate 10 which is a transparent substrate, and is arranged in a vertical direction (y direction). A rectangular segment electrode (hereinafter, sometimes referred to as a second electrode) 13 is arranged in a matrix form with a first insulating film interposed therebetween. The interval between the segment electrodes 13 is dx in the x direction and dy in the y direction. On the segment electrode 13, a common electrode (hereinafter, sometimes referred to as a third electrode) 15 extends in the y-direction and is arranged in the x-direction via the second insulating film.

The first electrode 11, the second electrode 13, and the third electrode 15 are all formed of ITO (Indium Tin Oxide) which is a transparent oxide conductive film. This is for increasing the light transmittance of the liquid crystal light valve and preventing the occurrence of moiré due to interference between wirings and the like in the liquid crystal light valve and wirings and the like in the liquid crystal display panel. Examples of other transparent oxide conductive films are AZO (Antimony Zinc Oxide), IZO (Indium Zinc Oxide) and so forth.

FIG. 5 is a schematic view, and therefore, the actual magnitude relationship is not accurately reflected. In actual dimensions, for example, a width of the first electrode (data line) 11 is about 120 to 140 μm, a size of the second electrode (segment electrode) 13 is about 1000 μm, and a width of the third electrode (common electrode) 15 is about 10 μm or less, for example, about 4 μm. In FIG. 5, a second substrate 20 which is a transparent substrate is disposed so as to oppose the third electrode 15 and sandwich a liquid crystal layer. The thickness of the liquid crystal layer is, for example, 3 to 4 μm. Although not shown in FIG. 5, an alignment film is formed on the third electrode 15, and an alignment film is formed on the second substrate 20, too.

Figure 6:
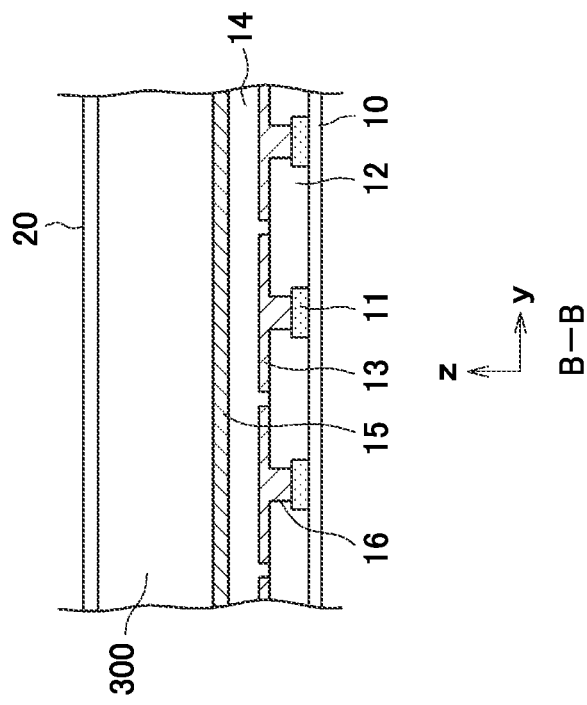
FIG. 6 is a cross sectional view along the line A-A of FIG. 5.

FIG. 6 is a cross-sectional view taken along line A-A of FIG. 5. In FIG. 6, the first electrode 11 which is a data line is arranged on the first substrate 10, a first insulating film 12 which is made of SiO or the like is formed thereon, and a second electrode 13 which is a segment electrode is formed on the first insulating film 12. In FIG. 6, the first electrode 11 is connected to the leftmost second electrode 13 via a through-hole 16 formed in the first insulating film 12. Another second electrode 13 is connected to another first electrode 11 at other locations.

A second insulating film 14 formed of SiN or the like is formed over the second electrode 13, and a third electrode 15 which is a common electrode is formed on the second insulating film 14 in a stripe shape in a direction perpendicular to the first electrode 11. The width of the third electrode 15 is, for example, about 4 μm, and the pitch in the x direction is, for example, about 7 μm, and is very fine compared with the other electrodes. A liquid crystal layer 300 is sandwiched between the third electrode 15 and the counter substrate 200.

When a data voltage is applied to the second electrode 13, which is a segment electrode, electric lines of force that pass through the liquid crystal layer 300 are generated between the second electrode 13 and the third electrode 15, and the liquid crystal molecules 301 are rotated to control the transmittance of the liquid crystal layer 300. In other words, the transmittance of the liquid crystal layer 300 is controlled for each of the second electrodes 13.

Figure 7:
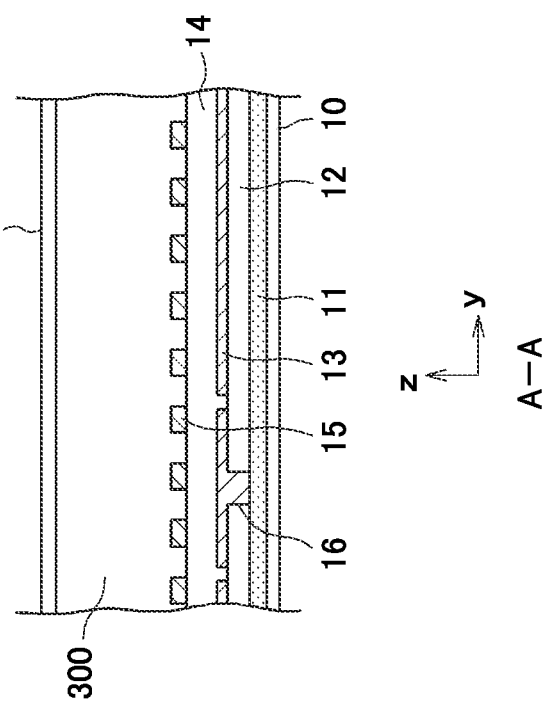
FIG. 7 is a cross sectional view along the line B-B of FIG. 5.

FIG. 7 is a cross-sectional view taken along line B-B of FIG. 5. In FIG. 7, the first electrode 11 which is a data line is formed in a stripe shape, and the first insulating film 12 is formed so as to cover the first electrode 11. A second electrode 13 as a segment electrode is formed on the first insulating film 12. In FIG. 7, each segment electrode 13 is connected to the data line 11 via a through hole 16. In FIG. 7, a third electrode 15 extends in the y-direction on the second insulating film 14. A liquid crystal layer 300 is provided between the third electrode 15 and the second substrate 20.

Figure 8:
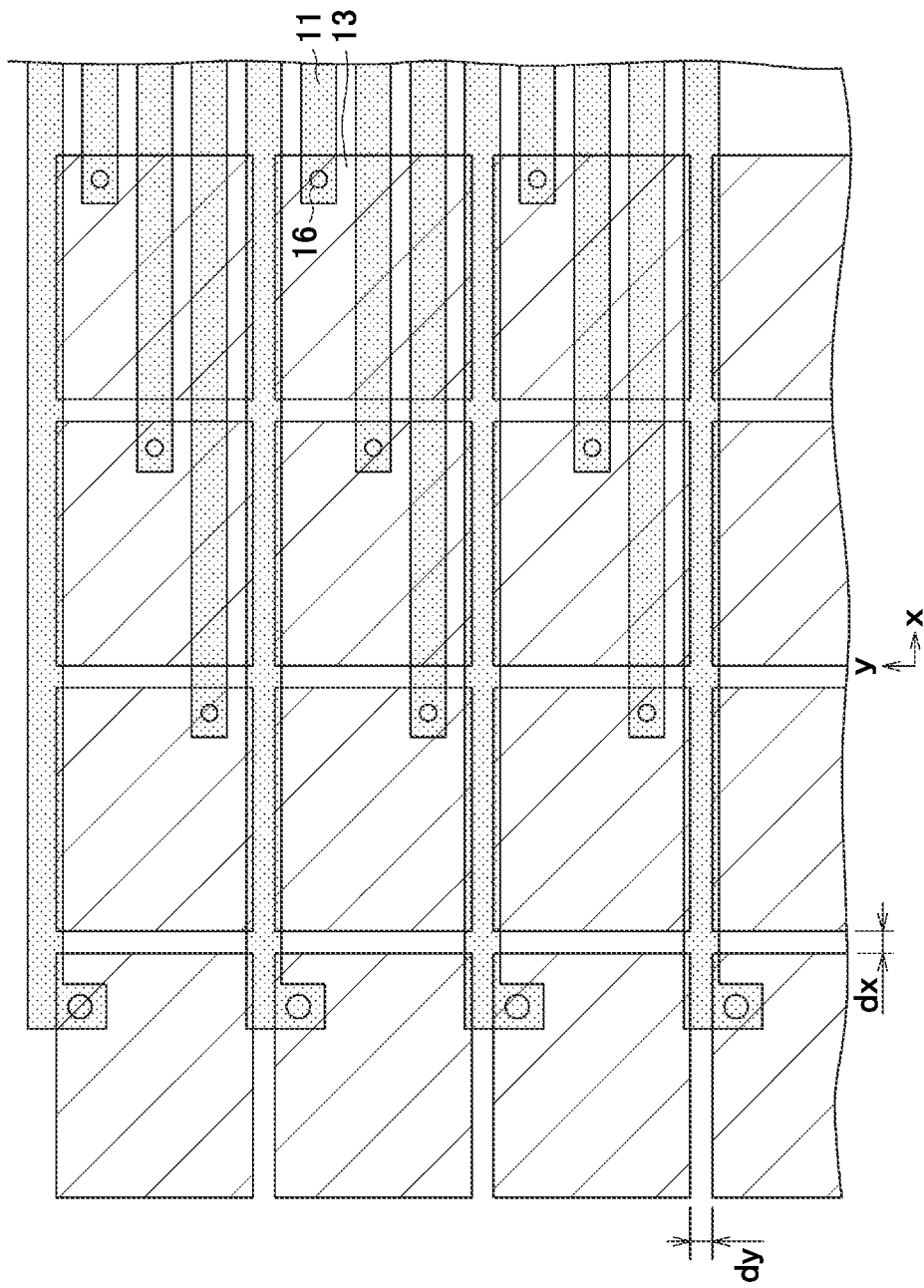
FIG. 8 is a plan view of the first electrode and the second electrode in a liquid crystal light valve.

FIG. 8 is a plan view showing a method of supplying a voltage from the first electrode 11 to the second electrode 13. A first insulating film is formed between the first electrode 11 and the second electrode 13. FIG. 8 shows a case where voltages are supplied from thirteen first electrodes 11 to thirteen second electrodes 13. In FIG. 8, the second electrodes 13 are arranged in a matrix with a horizontal interval dx and a vertical interval dy. The first electrode 11 and the second electrode 13 are connected via a through hole 16 formed in the first insulating film.

Figure 9:
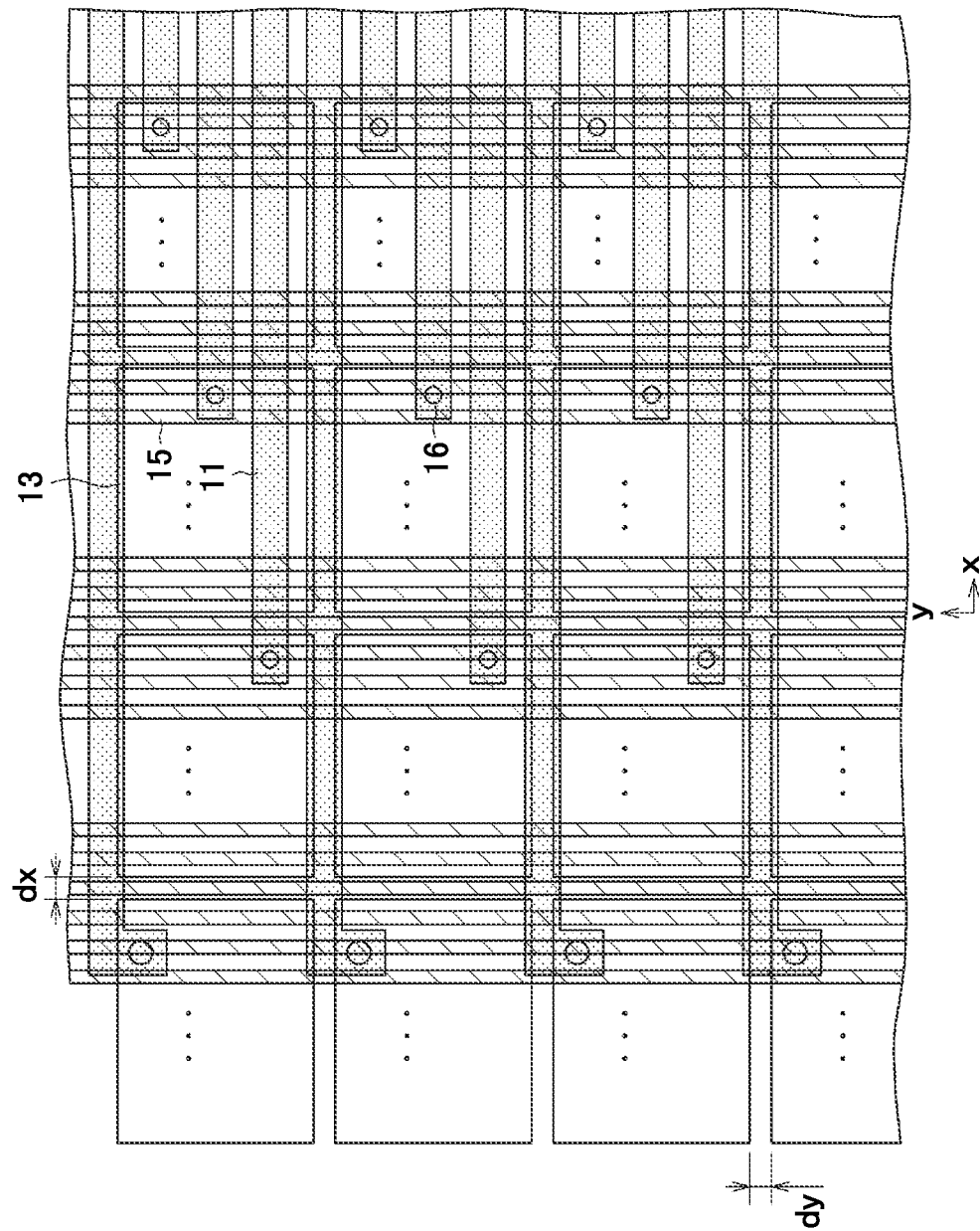
FIG. 9 is a plan view of the first electrode, the second electrode and the third electrode in a liquid crystal light valve.

FIG. 9 is a plan view showing a state in which the third electrode 15 is formed on the second electrode 13 of FIG. 8 via the second insulating film. In FIG. 3, the third electrode 15 extends in a striped shape in the y direction, which is perpendicular to the extending direction of the first electrode 11, and is arranged in the x direction. The width of the third electrode 15 is, for example, about 4 μm, and the width of the first electrode 11 is about 130 μm, but in FIG. 9, for easier understanding, the width of the third electrode 15 is drawn larger than that of the actual width.

In FIG. 9, a liquid crystal layer is present on the third electrode 15. When a voltage is supplied from the first electrode 11 to the second electrode 13 which is a segment electrode, electric lines of force through the liquid crystal layer are generated. The liquid crystal molecules are rotated to control the transmittance of the liquid crystal for each of the second electrodes 13, thereby operating as a liquid crystal light valve.

The second electrodes 13 are arranged at intervals of dy in the vertical direction and dx in the horizontal direction per segment. In this gap portion of width dx or width dy, a region where the third electrode 15 and the first electrode 11 directly act is generated. This region causes light leakage because light control is not possible. It is an object of the present invention to remedy light leakage between the second electrode 13 and the second electrode 13.

Figure 10:
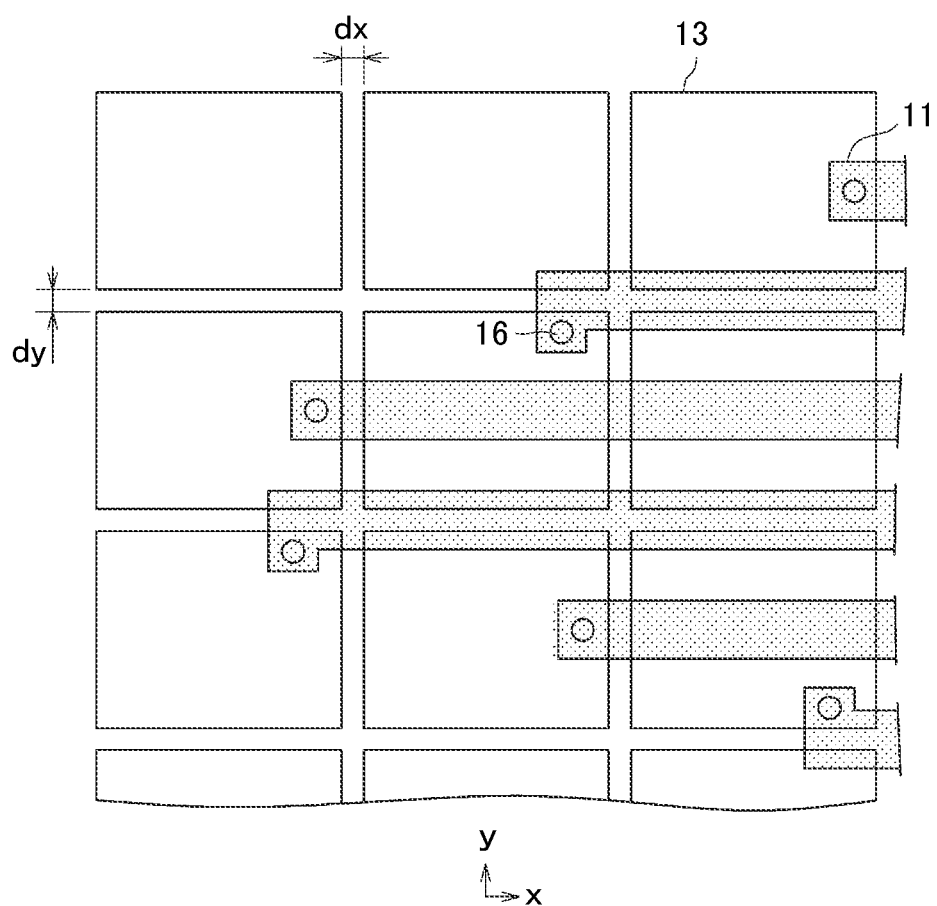
FIG. 10 is a simplified plan view of the first electrode and the second electrode in a liquid crystal light valve.
Figure 11:
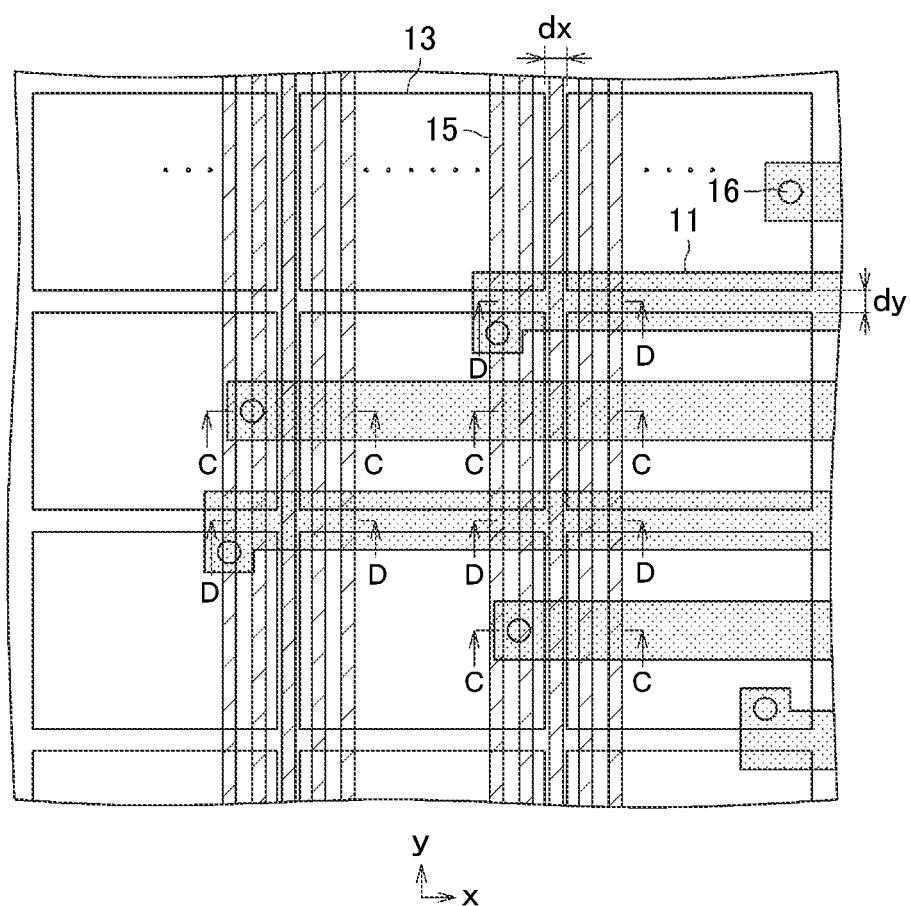
FIG. 11 is a simplified plan view of the first electrode, the second electrode and the third electrode in a liquid crystal light valve.

FIG. 10 and FIG. 11 are plan views showing a case where the number of the first electrode 11 and the second electrode 13 is reduced to simplify the drawing. FIG. 10 is a plan view showing only the first electrode 11 and the second electrode 13. FIG. 10 shows a case where six first electrodes 11 are connected to six second electrodes 13. The first electrode 11 extends in the x-direction. The first electrode 11 and the second electrode 13 are connected via a through-hole 16 formed in the first insulating film.

FIG. 11 is a plan view showing a state in which the third electrode 15 is formed on the second electrode 13 via the second insulating film. The third electrode 15 extends in the y direction perpendicular to the extending direction of the first electrode 11. The third electrode 15 has a width of about 4 μm, a pitch of about 7 μm; and many lines of third electrodes 15 are arranged in the horizontal direction. The second electrodes 13 are arranged in a matrix with a gap dy in the y-direction and a gap dx in the x-direction.

In FIG. 11, a portion indicated by an arrow C-C or an arrow D-D is a portion where the third electrode 15 and the first electrode 11 directly oppose each other without the second electrode 13. A predetermined voltage is supplied to the second electrode 13 from the first electrode 11, so that the transmittance of the liquid crystal layer is controlled by the second electrode 13. However, at a portion where the third electrode 15 and the first electrode 11 directly oppose each other, the intended voltage is not applied, so that the transmittance of the liquid crystal layer cannot be controlled. That is, this portion causes uneven brightness such as light leakage.

Figure 12:
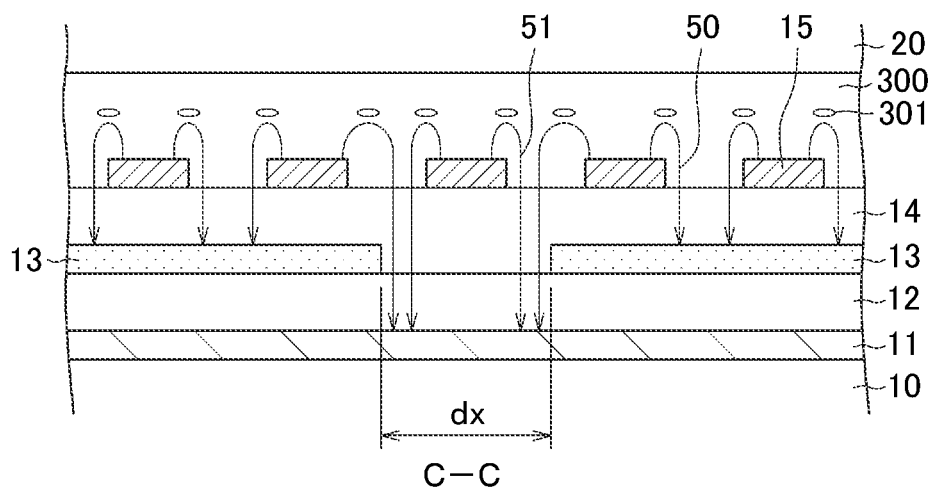
FIG. 12 is a cross sectional view along the line C-C of FIG. 11.

FIG. 12 is a cross-sectional view taken along line C-C of FIG. 11. In FIG. 12, a third electrode 15 is disposed between the gap dx of the second electrode 13 and the second electrode 13. As shown in FIG. 12, in the gap dx and around the gap dx, electric force lines 51 are generated directly from the third electrode 15 to the first electrode 11 via the liquid crystal layer 300. The electric line of force 50 from the third electrode 15 to the second electrode 13 is a controllable electric line of force, but since the electric line of force 51 is a line of electric force which cannot be controlled, a problem such as light leakage occurs.

Figure 13:
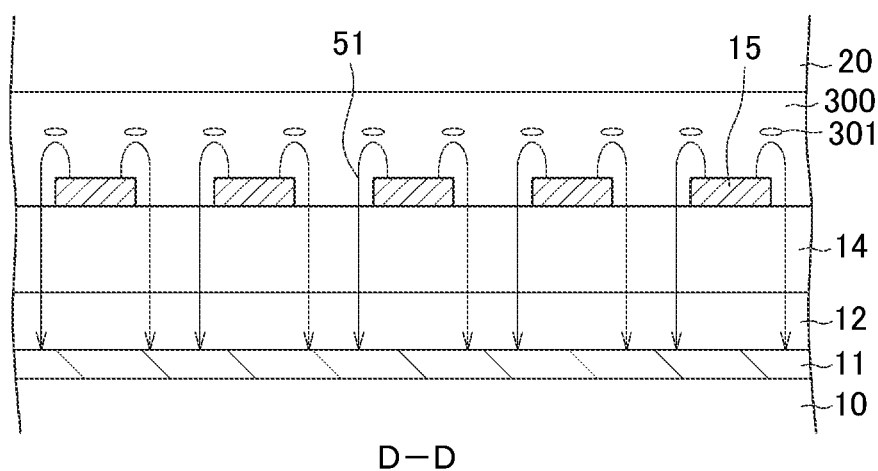
FIG. 13 is a cross sectional view along the line D-D of FIG. 11.

FIG. 13 is a cross-sectional view taken along line D-D of FIG. 11. In FIG. 13, since no second electrode 13 is present, all of the lines of electric force from the third electrode 15 are directed toward the first electrode 11. As shown in FIG. 13, since this region is formed along the extending direction of the first electrode 13, it has an influence over a wider range than the C-C cross section. Thus, it becomes a more serious problem.

Figure 14:
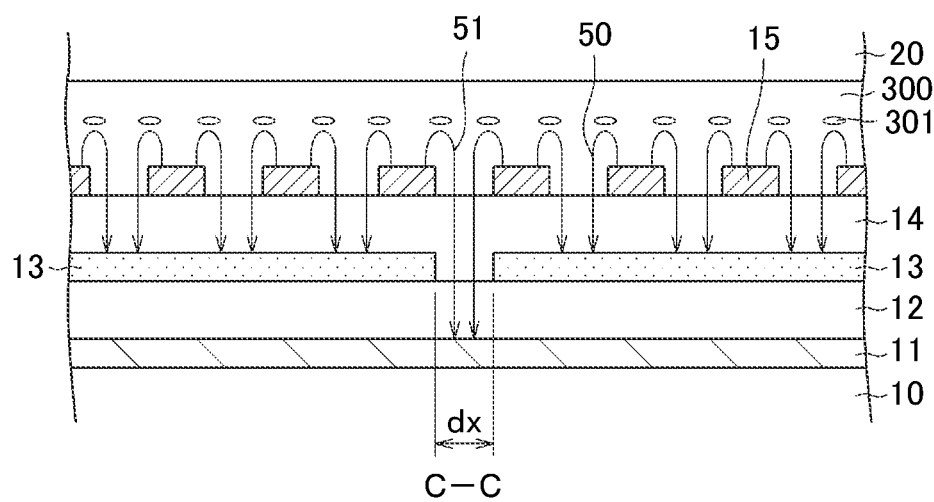
FIG. 14 is a cross sectional view of another structure along the line C-C of FIG. 11.

FIG. 14 shows another example of the C-C section of FIG. 11, and shows a case where the interval dx of the second electrode 15 is made smaller than in the case of FIG. 12. As shown in FIG. 14, when the interval dx between the 2 electrodes 13 is reduced, the amount of light passing through dx decreases. Light passing between the second electrodes 13 is diffused by a polarizing plate, a liquid crystal display panel, or the like. When the amount of light becomes smaller than a certain value, the ratio of the influence of diffusion becomes remarkable, and the light leakage becomes extremely inconspicuous. This effect becomes remarkable at 10 μm or less, and the light leakage becomes almost inconspicuous at 5 μm or less.

In order to reduce the effect of light leakage, the smaller the gap between the second electrodes 13 is the better, however, the more difficult it is to reduce the gap to less than 2 μm from the request of the process. Accordingly, the gap between the second electrodes 13 is not less than 2 μm and not more than 10 μm, more preferably not less than 2 μm and not more than 5 μm. The structure of FIG. 14 describes only the gap dx in the x-direction, but the principle can be applied to the gap dy in the y-direction.

A liquid crystal display panel is disposed on a front surface of the liquid crystal light valve. In a liquid crystal display panel, a black matrix which is a light shielding film is formed between pixels in order to enhance contrast. If this black matrix is used as a light shielding film for light passing between the second electrodes, light leakage can be efficiently prevented. The black matrix is formed on a counter substrate of the liquid crystal display panel.

Figure 15:
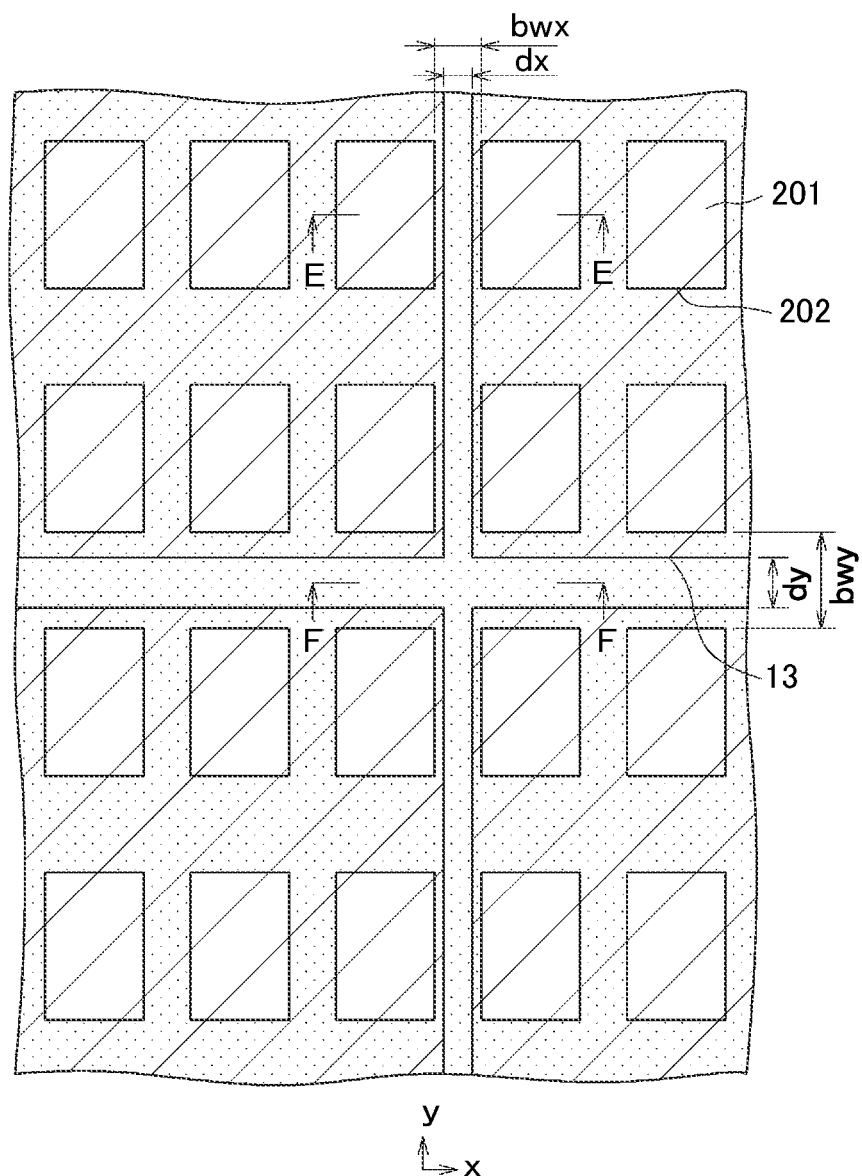
FIG. 15 is a plan view which shows a relation between the black matrix of the liquid crystal display panel and the second electrode of the liquid crystal light valve.

FIG. 15 is a plan view showing a relationship between a color filter 201 and a black matrix 202 formed on a counter substrate of a liquid crystal display panel, and a segment electrode formed in a liquid crystal light valve, that is, a second electrode 13. Referring to FIG. 15, a color filter 201 is formed in a matrix form on a counter substrate of a liquid crystal display panel corresponding to pixels, and all of the areas surrounding the color filters 201 are covered with a black matrix 202. In other words, all of the counter substrates are covered with the black matrix 202 except for the window of the pixel portion where the color filter 201 is formed. Hereinafter, a window of a pixel portion is simply referred to as a color filter 201.

In FIG. 15, an interval between the color filter 201 and the color filter 201 is bwx in the x direction and bwy in the vertical direction (y direction). In other words, a black matrix of width bwx extends longitudinally and a black matrix of width dwy extends laterally. The second electrode 13 formed on the liquid crystal light valve has a much larger area than a pixel formed on the liquid crystal display panel. FIG. 15 is a plan view of the vicinity of the corner of the 4 second electrodes 13.

As shown in FIG. 15, the distance between the second electrode 13 and the second electrode 13 may be smaller than the width of the black matrix 202. For example, as shown in FIG. 5, a dx<bwx, dy<bwy may be used. In FIG. 15, bwx is, for example, 4 to 5 μm, and bwy is, for example, 13 to 14 μm. If the corresponding dx, dy are made smaller than these values, light leakage can be prevented. However, since there is an assembly error of the liquid crystal display panel and the liquid crystal light valve, it is necessary to set the values of the bwx, bwy, dx, and dy in consideration of the manufacturing error.

By the way, the width bwy of the y direction of a black matrix is larger than the width bwx of a x direction. On the other hand, as shown in FIG. 11, the light leakage between the second electrodes 13 is large in the y direction, e.g., in the portion indicated by the arrow D-D. Accordingly, in the liquid crystal light valve, light leakage due to the gap between the second electrodes 13 can be effectively prevented by the black matrix 202 of the liquid crystal display panel particularly in the y direction.

Figure 16:
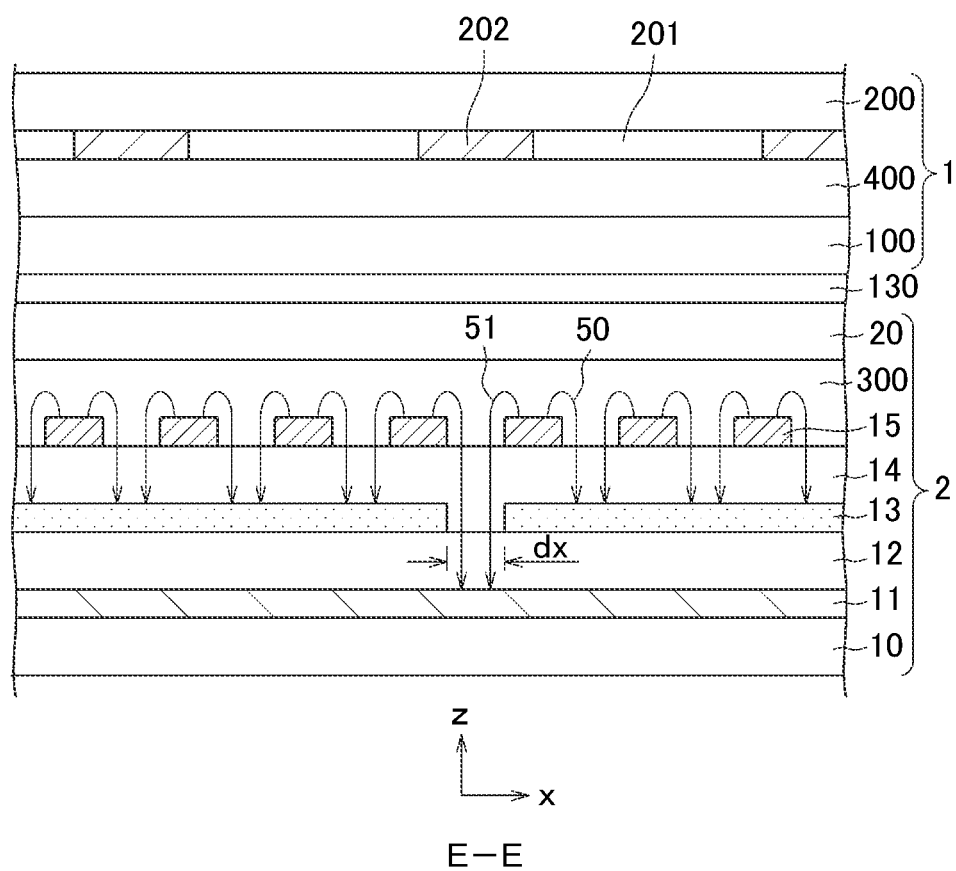
FIG. 16 is a cross sectional view corresponding to the line E-E of FIG. 15.

FIG. 16 is a cross-sectional view corresponding to the section E-E of FIG. 15. In FIG. 16, a third electrode 15 and a first electrode 11 in the liquid crystal light valve are added to FIG. 15. In FIG. 16, a liquid crystal display panel 1 is adhered on a liquid crystal light valve 2 via a transparent adhesive 130. The layer structure of the liquid crystal light valve 2 is the same as that described in FIG. 6. In the liquid crystal display panel 1, a counter substrate 200 is disposed on a TFT substrate 100 via a liquid crystal layer 400. A black matrix 202 and a color filter 201 are formed on the counter substrate 200. As shown in FIG. 16, light leakage from the gap between the second electrodes 13 is blocked by the black matrix 202 of the liquid crystal display panel 1.

Figure 17:
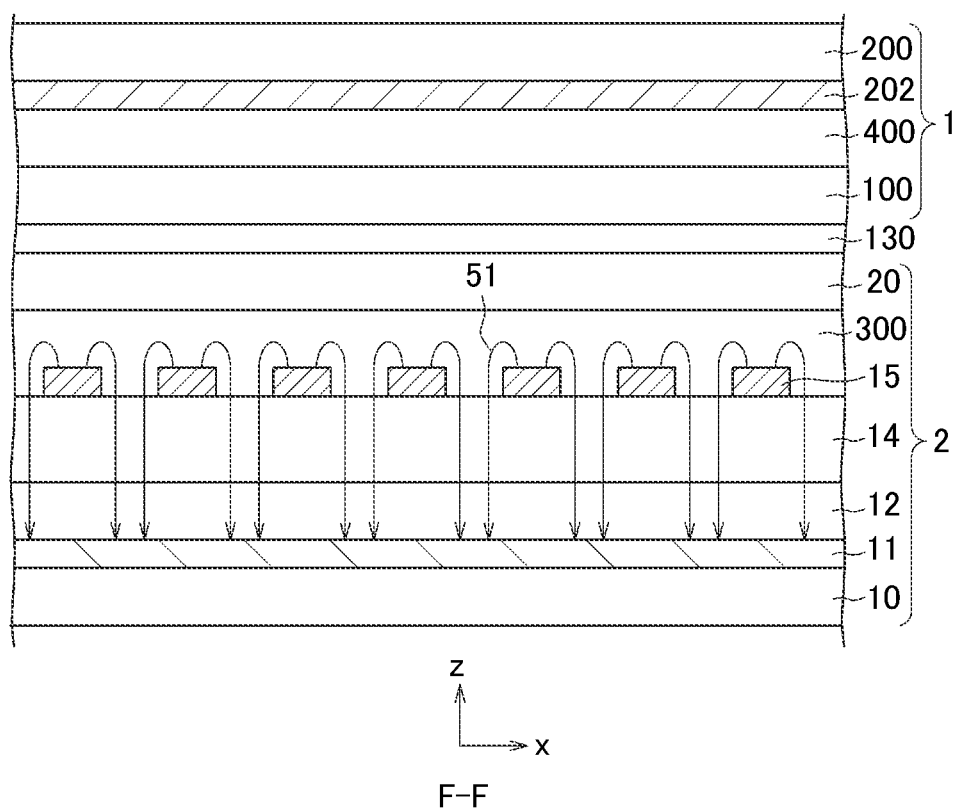
FIG. 17 is a cross sectional view corresponding to the line F-F of FIG. 15.

FIG. 17 is a cross-sectional view corresponding to the section F-F of FIG. 15. In FIG. 17, a third electrode 15 and a first electrode 11 in the liquid crystal light valve are added to FIG. 15. A layer structure of the liquid crystal light valve 2 and the liquid crystal display panel 1 in FIG. 17 is the same as that described in FIG. 16. In the liquid crystal light valve 2, however, FIG. 17 shows a region where the second electrode 13 is not present. Therefore, the electric force lines 51 from the third electrode 15 are all directed toward the first electrode 11 via the liquid crystal layer 300. In other words, in this section, since all of the light from the backlight is transmitted, the effect of light leakage is very large.

However, as shown in FIG. 17, since the black matrix 202 is present on the counter substrate 200 of the liquid crystal display panel 1, all of the light leakage can be shielded by the black matrix 202. Further, as described in FIG. 15, since the width bwy of the black matrix 202 in this portion is large, and can be made large enough to cover the gap between the second electrodes 13 with a margin, the light shielding effect can be more stably performed.

Incidentally, in the liquid crystal light valve 2, similarly to the liquid crystal display panel 1, it is necessary to keep a thickness of the liquid crystal layer 300 uniform. For this purpose, for example, a columnar spacer is used as in the case of the liquid crystal display panel 1. Since no liquid crystal is present in the portion where the columnar spacer is formed, light leakage occurs. Therefore, by arranging the columnar spacers in the liquid crystal light valve 2 at positions corresponding to the black matrix 202 in the liquid crystal display panel 1 when viewed from a plane, it is possible to suppress an influence of the columnar spacer on light leakage.

Figure 18:
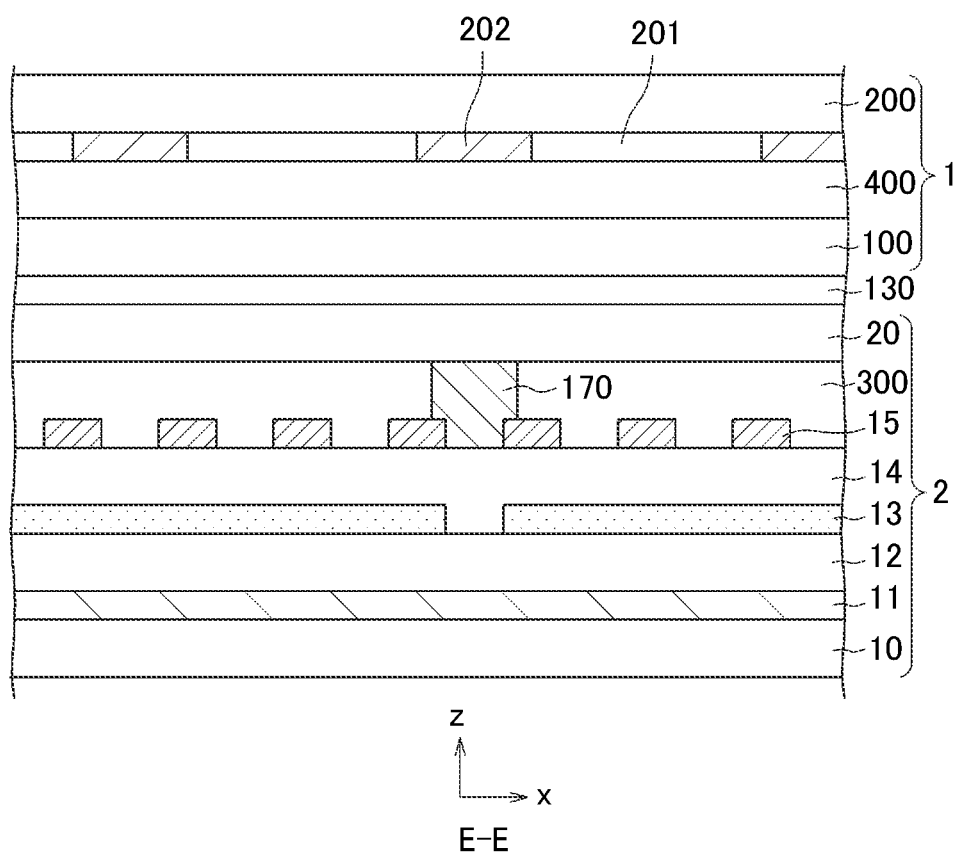
FIG. 18 is a cross sectional view of the light valve when a columnar spacer is used.

FIG. 18 shows an example in which a columnar spacer 170 is arranged in the liquid crystal light valve 2 in the same cross section as in FIG. 16. In FIG. 18, the columnar spacer 170 is disposed at a portion corresponding to a gap between the second electrode 13 and the second electrode 13 in the x-direction and at a portion corresponding to the black matrix 202 in the liquid crystal display panel 1.

Figure 19:
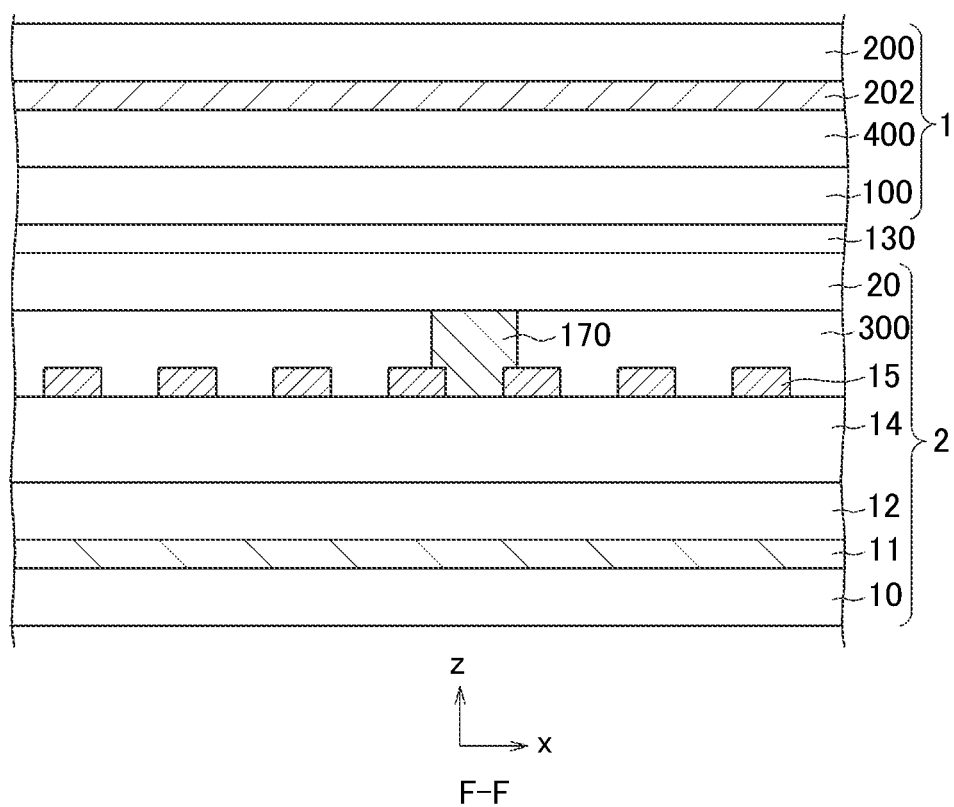
FIG. 19 is another cross sectional view of the light valve when a columnar spacer is used.

FIG. 19 shows an example in which a columnar spacer 17 is arranged in the liquid crystal light valve 2 in the same cross section as in FIG. 17. In FIG. 19, the columnar spacer 170 is disposed at a portion corresponding to a gap between the second electrode 13 and the second electrode 13 in the y direction and at a portion corresponding to the black matrix 202 in the liquid crystal display panel 1.

In both of FIGS. 18 and 19, light leakage corresponding to the columnar spacer 170 formed in the liquid crystal light valve 2 can be shielded by the black matrix 202 formed in the liquid crystal display panel 1.

As described above, according to the present embodiment, it is possible to suppress light leakage from the gap between the second electrode 13 and the second electrode 13 by controlling the distance between the second electrodes 13 in the liquid crystal light valve 2 or by aligning of the positions of the gap between the second electrodes 13 in the liquid crystal light valve 2 and the black matrix 202 in the liquid crystal display panel 1; thus, it is possible to realize a liquid crystal display device having an excellent contrast.

Embodiment 2

The liquid crystal light valve used in the present invention is a system called an "FFS (Fringe Field Switching)" mode in an IPS system, and as shown in FIGS. 12, 13, and 14, the liquid crystal molecules 301 are rotated by an electric force line 50 passing between the third electrode 15 and the third electrode 15 to control the transmitted light. Accordingly, the light leakage can be suppressed by covering the gap between the second electrode 13 and the second electrode 13 by the third electrode 15, in a plan view, because a line of force through the liquid crystal layer 300 is not generated.

Figure 20:
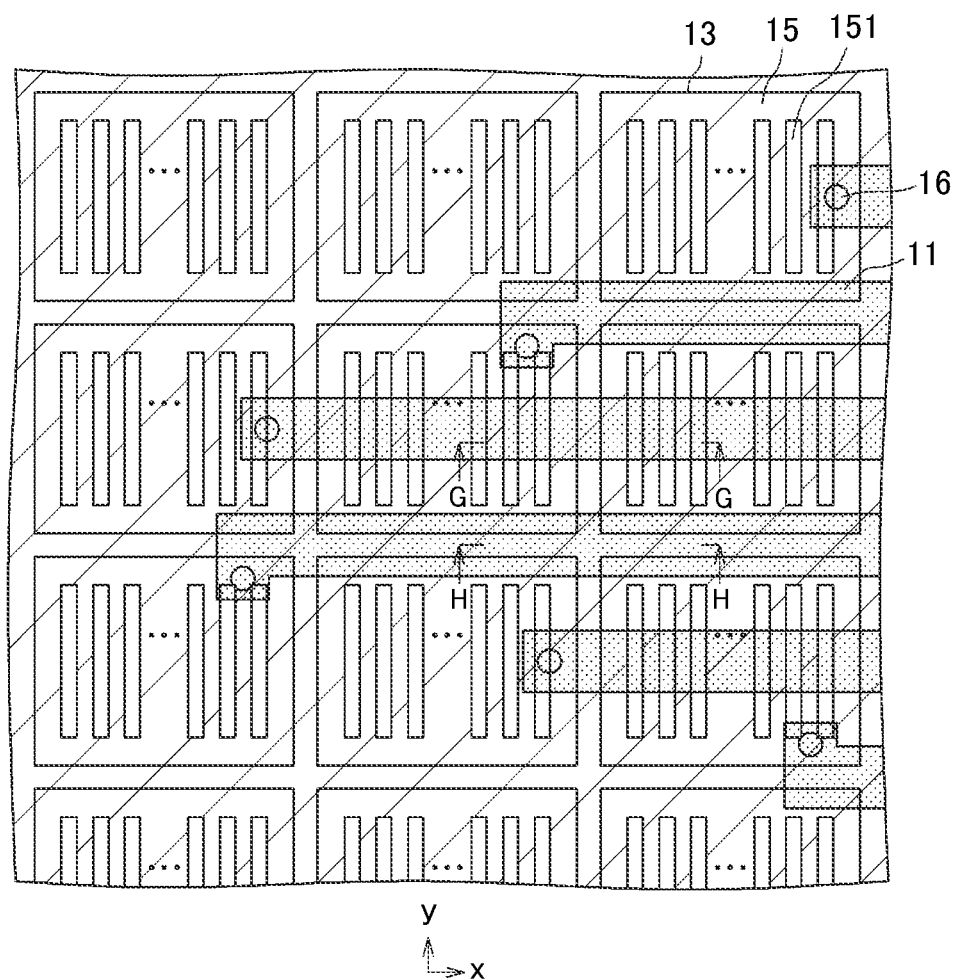
FIG. 20 is a plan view of the first electrode, the second electrode, and the third electrode of the liquid crystal light valve according to embodiment 2.

FIG. 20 is a plan view showing the relationship between the first electrode 11, the second electrode 13, and the third electrode 15 in the liquid crystal light valve of this embodiment. FIG. 20 differs from FIG. 11 in Embodiment 1 in that the third electrodes 15 do not extend in the y-direction, however, slits 151 are formed in the third electrode 15 corresponding to the second electrode 13 in a plan view. Consequently, in FIG. 20, the gap between the second electrode 13 and the second electrode 13 is covered by the third electrode 15 in a plan view. Thus, in this portion, the electric field from the first electrode 11 is shielded by the third electrode 15 and does not reach the liquid crystal layer 300, and the influence on the light leakage can be suppressed. That is, light leakage in this portion can be prevented.

Figure 21:
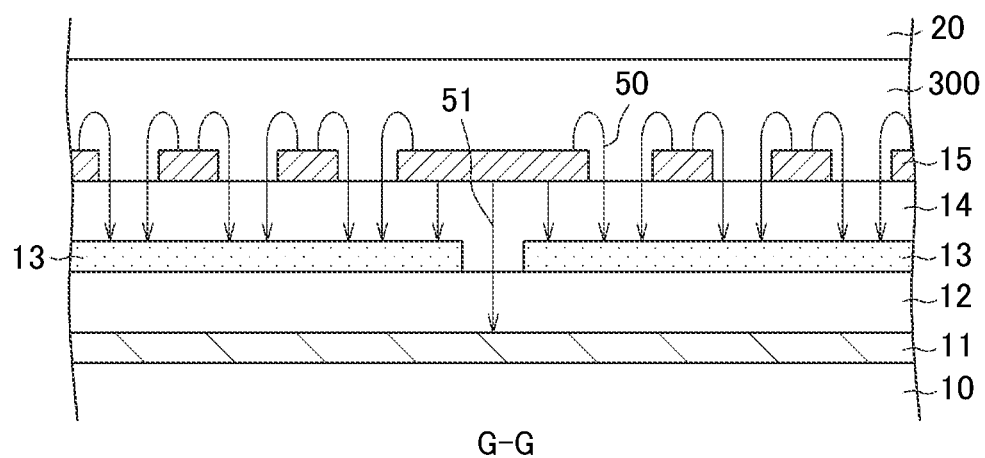
FIG. 21 is a cross sectional view corresponding to the line G-G of FIG. 20.

FIG. 21 is a cross-sectional view taken along line G-G of FIG. 20. As shown in FIG. 21, since a gap between the second electrode 13 and the second electrode 13 are shielded by the third electrode 15, the influence of the first electrode 11 does not reach the liquid crystal layer 300. Therefore, light leakage in this portion can be prevented.

Figure 22:
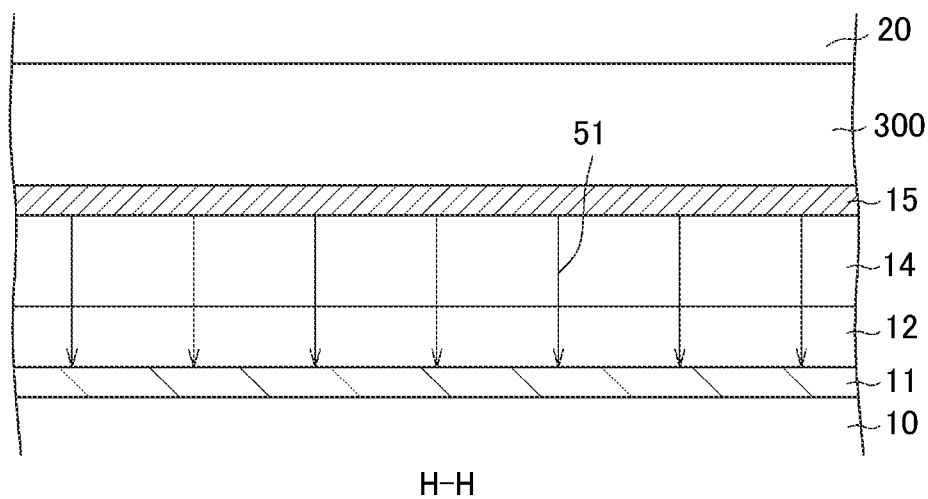
FIG. 22 is a cross sectional view corresponding to the line H-H of FIG. 20.

FIG. 22 is a cross-sectional view taken along line H-H of FIG. 20. This region is a region where the second electrode 13 is not present, but the electric field from the first electrode 11 is shielded by the third electrode 15. Therefore, since the influence of the first electrode 11 does not reach the liquid crystal layer 300, light leakage in this portion can be prevented.

Figure 23:
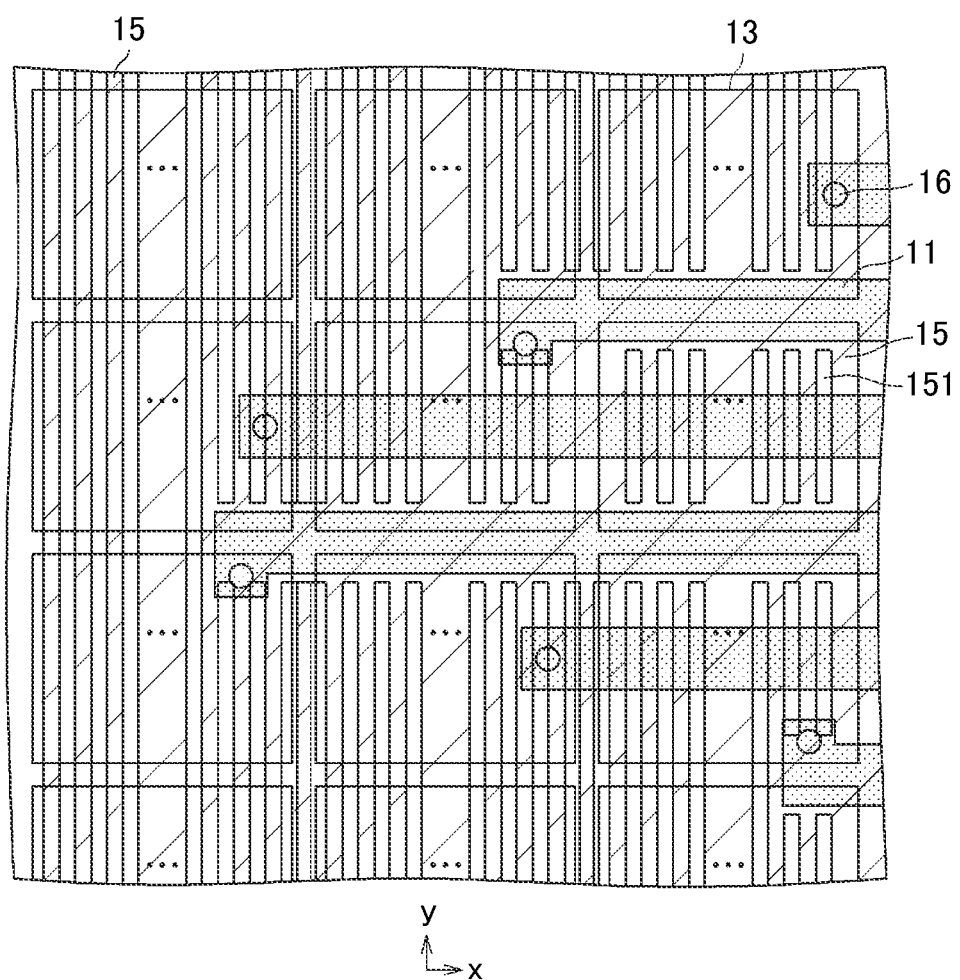
FIG. 23 is a plan view of the first electrode, the second electrode, and the third electrode of the liquid crystal light valve according to another example of embodiment 2.

FIG. 23 is a plan view showing another example of the present embodiment. FIG. 23 is different from FIG. 20 in that the shield by the third electrode 15 is formed only in the portion where the first electrode 11 is disposed in the gap between the second electrode 13 and the second electrode 13 when viewed in a plan view. In other words, even if there is a gap between the second electrode 13 and the second electrode 13, if the first electrode 11 does not exist at that portion, the influence of the first electrode 11 does not reach the liquid crystal layer 300.

In the configuration of FIG. 23, the third electrode 15 does not exist where the first electrode 11 does not exists, even at the gap portion between the second electrodes 13; thus, the liquid crystal light valve as a whole can have a light transmittance enlarged than that of the structure of FIG. 22. On the other hand, there is a possibility that luminance unevenness may occur between the portion where the shield of the third electrode 15 is not provided and the portion where the third electrode 15 is provided, in comparison with the case in FIG. 20.

As described above, according to the present embodiment, by the configuration of the third electrode 15 in the liquid crystal light valve, light leakage between the second electrode 13 and the second electrode 13 can be prevented, and a liquid crystal display device having excellent contrast can be realized.

Embodiment 3

The reason for the light leakage to be dealt with in the present invention is that the influence of the first electrode 11 reaches the liquid crystal layer 300 through a gap between the second electrode 13 and the second electrode 13. In this embodiment, the second electrode 13 has a two layer structure so that a gap is not formed between the second electrodes 13 in a plan view, thus the present embodiment can prevent the influence of the first electrode from reaching the liquid crystal layer 300.

Figure 24:
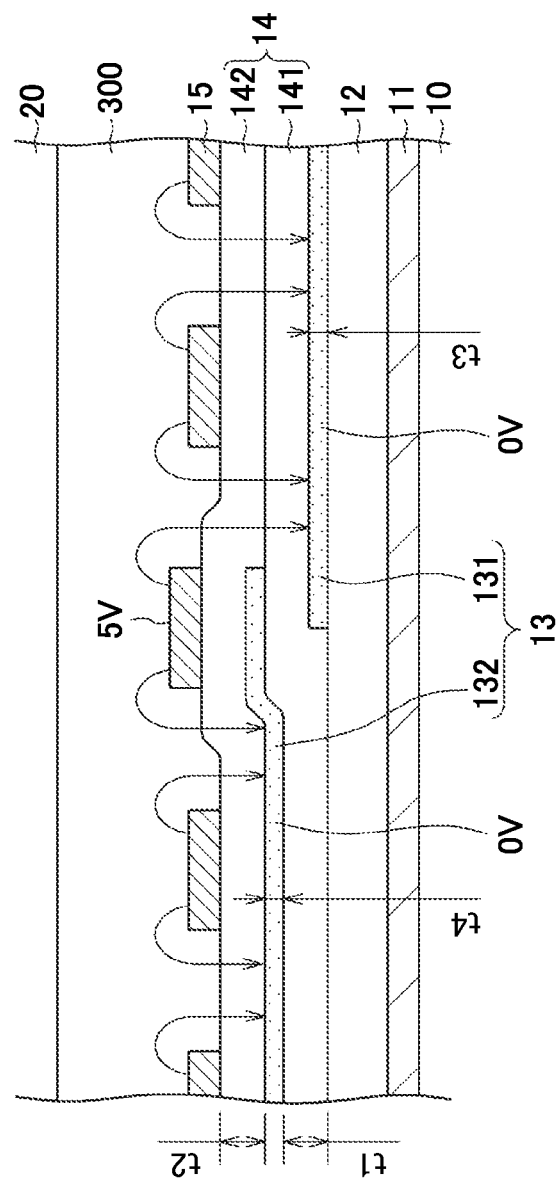
FIG. 24 is a cross sectional view of embodiment 3.

FIGS. 24 and 25 are sectional views showing this principle. FIG. 24 shows a case where the same potential is applied to the adjacent second electrodes 13, and FIG. 25 shows a case where different potentials are applied to the adjacent second electrodes 13. In FIGS. 24 and 25, for convenience, a voltage of 5 V is applied to the third electrode 15 and a voltage of 0 or 5 V is applied to the second electrodes 131 and 132, but conversely, a voltage of 0 V may be applied to the third electrode 15 and 5 or 0 V may be applied to the second electrodes 131 and 132.

In FIG. 24, the first electrode 11 is formed on the first substrate 10, and the first insulating film 12 is formed thereon. A lower second electrode 131 is formed on the first insulating film 12, a lower second insulating film 141 is formed thereon, and an upper second electrode 132 is formed thereon. Then, an upper second insulating film 142 is formed on the upper second electrode 132, and a third electrode 15 is formed on the upper second insulating film 142.

In FIG. 24, the lower second electrode 131 and the upper second electrode 132 have the same potential. As shown in FIG. 24, the influence of the first electrode 11 is shielded by the second electrodes 131 and 132 and does not reach the liquid crystal layer 300. Thus, the liquid crystal layer 300 is totally controlled by the second electrodes 131 and 132, and the third electrode 15, consequently, no light leakage occurs.

FIG. 25 shows a case where different potentials are applied to the lower second electrode 131 and the upper second electrode 132. The layer structure of FIG. 25 is similar to that described in FIG. 24. FIG. 25 shows a case where an electric field for driving the liquid crystal layer 300 is generated on the side of the upper second electrode 132, and an electric field for driving the liquid crystal layer 300 is not generated on the side of the lower second electrode 131. In this case, an electric force line is generated at a portion where the lower second electrode 131 and the upper second electrode 132 overlap each other, however, this effect does not affect the liquid crystal layer 300.

Also in FIG. 25, the influence of the first electrode 11 is shielded by the lower second electrode 131 and the upper second electrode 132 and does not affect the liquid crystal layer 300. Therefore, light leakage due to the influence of the first electrode 11 does not occur. Thus, regardless of the voltage applied to the lower second electrode 131 and the upper second electrode 132, no influence is exerted on the liquid crystal layer 300 of the first electrode 11, and no light leakage occurs.

Incidentally, as shown in FIG. 24 and FIG. 25, an interval between the third electrode 15 and the upper second electrode 132 is different from an interval between the third electrode 15 and the lower second electrode 131. That is, assuming that the thickness of the upper second insulating film 142 is t2 and the thickness of the lower second insulating film 141 is t1, the interval between the third electrode 15 and the upper second electrode 132 is t2, and the interval between the third electrode 15 and the lower second electrode 131 is t1+t2. For example, each of the thickness t2 of the upper second electrode 142 and the thickness t1 of the lower second electrode 141 is 200 nm, and each of the thickness t4 of the upper second electrode 132 and the thickness t3 of the lower second electrode 131 is 70 nm.

As a result, even if the same voltage is applied, the electric field intensity in the liquid crystal layer 300 differs between the region of the upper second electrode 132 and the region of the lower second electrode 131, which affects the transmittance of the liquid crystal layer 300 and may cause uneven luminance. Therefore, by making the thickness t2 of the upper second insulating film 142 larger than the thickness of the lower second insulating film 141, the liquid crystal transmittance in the regions of the lower second electrode 131 and the upper second electrode 132 can be made more uniform.

However, since the lower second insulating film 141 must maintain insulation between the upper second electrode 132 and the lower second electrode 131, it cannot be made extremely thin. Therefore, as shown in FIG. 26, when the upper second insulating film 142 is formed only on the portion where the upper second electrode 132 is formed and is removed in the other regions, the liquid crystal transmittance can be made uniform over the entire light control region of the liquid crystal light valve 2. In FIG. 26, the thickness of the lower second insulating film t1 is equal to that of the upper second insulating film t2.

Incidentally, since there is no particular limitation on the planar shape of the lower second electrode 131 and the upper second electrode 132, it can be determined freely, however, it is necessary to have a configuration in which the lower second electrode 131 and the upper second electrode 132 can be closely packed in a plan view. Further, it is necessary to arrange the lower second electrode 131 and the upper second electrode 132 alternately.

Figure 28:
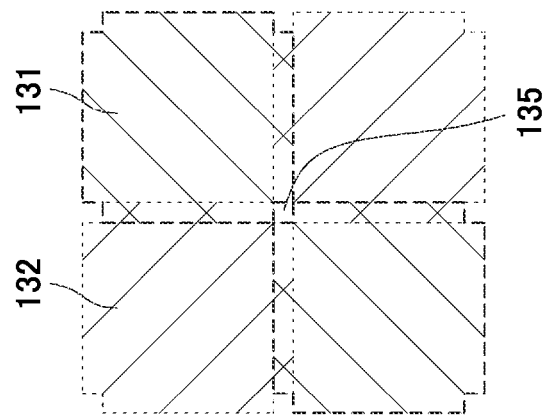
FIG. 28 is a plan view of the second electrode according to another example of embodiment 3.
Figure 27:
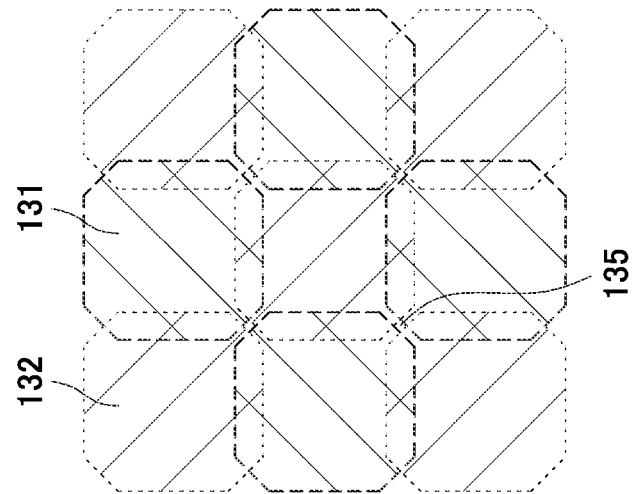
FIG. 27 is a plan view of the second electrode according to embodiment 3.

FIGS. 27 and 28 are plan views showing an arrangement example of the lower second electrode 131 and the upper second electrode 132 in this embodiment. FIG. 27 shows a case in which the lower second electrode 131 and the upper second electrode 132 are substantially rectangular. However, a hole 135, in which none of the lower first electrode 131 and the upper first electrode 132 exist, is generated in order to maintain insulation between the lower second electrodes 131 formed on the same layer and insulation between the upper second electrodes 132 formed on the same layer. This hole 135 is generated at a corner portion of each electrode, in other words, at a diagonal corner portion. Therefore, it is necessary to prevent the first electrode 11 from being present in this portion. Alternatively, it is necessary to employ the shielding means as described in Embodiment 1 and Embodiment 2 in this portion.

FIG. 28 shows a case where the lower second electrode 131 and the upper second electrode 132 have 8 corners. In this case, too, a portion 135 where neither the lower second electrode 131 nor the upper second electrode 132 is present, in other words, the hole 135 is generated.

In order to make the area which the third electrode 15 opposes to the lower second electrode 131 and the area which the third electrode 15 opposes to the upper second electrode 132 same when viewed from the front of the liquid crystal light valve, it is preferable that the area of the lower second electrode 131 is larger than that of the upper second electrode 132. In other words, the above configuration is necessary because the effect of the lower second electrode 131 on the liquid crystal layer 300 is reduced by the area of the overlapping portion.

FIG. 29 shows this example. In FIG. 29, a shape of the upper second electrode 132 is rectangular, a shape of the lower second electrode 131 is 8 square, and an area of the upper second electrode 132 is smaller than that of the lower second electrode 131. In an area facing the third electrode 15, both the lower second electrode 131 and the upper second electrode 132 have substantially rectangular shapes, and have substantially the same area. In addition, a hole 135 is formed at a corner of each electrode as in the previous examples.

FIG. 30 is another example, in which the lower second electrode 131 is rectangular and the upper second electrode 132 is rectangular, but the area of the lower second electrode 131 is larger than that of the upper second electrode 132. However, the area which opposes to the third electrode 15 is the same between the lower second electrode 131 and the upper second electrode 132. Further, it is the same as that a hole 135 is formed at a corner of each electrode as in the previous examples.

As described above, according to Embodiment 3, it is possible to prevent light leakage in the liquid crystal light valve and to realize a liquid crystal display device with high contrast.

In the above description, the extending direction of the first electrode 11 and the extending direction of the third electrode 15 are perpendicular to each other, but the present invention is not limited thereto, and an angle formed by an extending direction of the first electrode 11 and an extending direction of the third electrode 15 may be an optional angle. For example, the extending direction of the first electrode 11 and the extending direction of the third electrode 15 may be parallel. Even with such a configuration, the principles described in Embodiments 1 to 3 can be applied.

What is claimed is:

1. A liquid crystal display device comprising:
a liquid crystal display panel;
a backlight; and
a liquid crystal light valve including no color pixel disposed between the liquid crystal display panel and the backlight,
wherein the liquid crystal display panel comprises a plurality of pixel sets each including more than one color pixels,
a liquid crystal is sandwiched between a first substrate and a second substrate in the liquid crystal light valve,
a plurality of first electrodes extending in a first direction are formed on the first substrate,
a plurality of second electrodes arranged in the first direction and a second direction intersecting the first direction,
the plurality of second electrodes overlaps at least one of the plurality of pixel sets in a plan view,
at least one of the plurality of first electrodes overlaps with an area between two adjacent second electrodes of the plurality of second electrodes arranged in the second direction in the plan view, and another one of the plurality of the first electrodes adjacent to the one of the plurality of first electrodes is provided between edges of one of the two adjacent second electrodes, wherein the edges extend in the first direction,
a first insulating film is formed on the first electrodes,
the plurality of second electrodes are formed in a matrix at intervals on the first insulating film,
a second insulating film is formed on the second electrodes,
a plurality of third electrodes extending in the second direction are formed on the second insulating film,
the backlight, the plurality of first electrodes, the plurality of second electrodes, and the plurality of third electrodes are stacked in this order,
the liquid crystal is sandwiched between the third electrodes and the second substrate,
the first electrodes, the second electrodes and the third electrodes are formed from a transparent conductive film, and
one of the intervals between the two adjacent second electrodes of the plurality of second electrodes is 2 to 10 µm.

2. The liquid crystal display device according to claim 1, wherein the one of the intervals between the two adjacent second electrodes of the plurality of second electrodes is 2 to 5 µm.

3. The liquid crystal display device according to claim 1, wherein a black matrix is formed in the liquid crystal display panel,
a width of the black matrix is larger than the one of the intervals between the two adjacent second electrodes of the plurality of second electrodes, and
the area between the two adjacent second electrodes of the plurality of second electrodes is covered by the black matrix in a plan view.

4. The liquid crystal display device according to claim 3, wherein the black matrix has a first width, which extends in the first direction, and a second width, which extends in the second direction,
the first width is larger than a second width,
the intervals between the plurality of second electrodes include a first interval in the first direction and a second interval in the second direction, and
the first width is larger than the second interval.

5. The liquid crystal display device according to claim 1, wherein an angle of intersection between the first direction and the second direction is rectangular.

6. The liquid crystal display device according to claim 1, wherein at least one of the third electrodes is provided over an area between the two adjacent second electrodes of the plurality of second electrodes.

* * * * *